United States Patent

[11] 3,593,863

[72] Inventor Paul M. Kintner
Bayside, Wis.
[21] Appl. No. 851,667
[22] Filed Aug. 20, 1969
[45] Patented July 20, 1971
[73] Assignee Cutler-Hammer, Inc.
Milwaukee, Wis.

[54] INTEGRATED CIRCUIT COURIER SYSTEM WITH SLOW REVERSE MOVEMENTS FOR CENTERING AT BIN
10 Claims, 9 Drawing Figs.

[52] U.S. Cl. .......... 214/16.4 A
[51] Int. Cl. .......... B65g 1/06
[50] Field of Search .......... 214/16.4, 16.42

[56] References Cited
UNITED STATES PATENTS

| | | | |
|---|---|---|---|
| 2,988,237 | 6/1961 | Devol .......... | 214/16.4 X |
| 3,402,836 | 9/1968 | Debory et al. .......... | 214/16.4 |

*Primary Examiner*—Gerald M. Forlenza
*Assistant Examiner*—Raymond B. Johnson
*Attorney*—Hugh R. Rather

ABSTRACT: In a warehouse having horizontal rows and vertical columns of bins in which packages are stored by a code-controlled courier, problems of alignment occur particularly when the bin columns are quite high. Horizontal and vertical movements bring the courier in front of a bin and left or right movements of the package supporting table move the package into or out of left and right bins, respectively. Since horizontal movement is controlled by a single series of code bars mounted along the top or bottom of the bin columns, any misalignment of the bins in a column from the vertical will cause a problem in stopping the courier at the middle of the bin particularly with respect to those bins spaced farthest from such series of code bars. To solve this problem, the code bars are arranged to stop the courier beyond the center of the bin and an integrated circuit logic system automatically causes slow reverse movement of the courier to "fine position," that is, photocells detect reflective tape at the center of the bin and stop the courier thereat. After the table has been extended and retracted, this integrated circuit logic system automatically controls return of the courier to the former code reading position to provide a read code for comparison with the input code for control of the next movement. This movement of the courier to fine position is an optional feature, requiring only simple jumper connections for use of the system without it where the columns are not high. In such case, the code reader or code bars may be positioned to stop the courier at the center of the bin under control of the code bars.

INTEGRATED CIRCUIT COURIER SYSTEM WITH SLOW REVERSE MOVEMENTS FOR CENTERING AT BIN

BACKGROUND OF THE INVENTION

Automatic stacker crane control systems have been known heretofore. Such systems have used either a counting system or a positive address, binary code system for controlling movements of and stopping of the article carrier in front of the bin. In a counting system, a number proportional to the distance to be traveled is put into the system and this number or count is counted out as the crane moves from bin to bin and stops at a zero count. In the positive address, binary code system, as disclosed in R. K. Cotton et al. copending application Ser. No. 498,326, filed Oct. 20, 1965, now U.S. Pat. No. 3,504,245, dated Mar. 31, 1970, a code representing the destination bin is put into the system and a magnetic code is read and subtracted therefrom at each bin to obtain a difference code indicative of the remaining distance and a polarity code indicative of the direction of travel, forward, reverse, up or down. Both of these systems might include means that take into account variation that there might be between the horizontal count or code position and the exact center of the bin. Since the single count or single series of code bars does not provide precise registration of the article table with respect to bins on a multiplicity of levels where there might be variation from vertical alignment, various fine positioning devices have been used.

SUMMARY OF THE INVENTION

This invention relates to improvements over prior systems whereby fine positioning of the courier in front of the center of the bin is attained at all levels by a simple, small and economical integrated circuit system.

An object of the invention is to provide a courier control system with improved optional means for controlling stopping of an article carrier in front of and at the center of a bin.

A more specific object of the invention is to provide a courier control system with improved fine positioning means effective following stopping of the article carrier at the bin under code control.

Another specific object of the invention is to provide a courier control system of the type having code-controlled means for controlling horizontal and vertical movements with economical noncode means at each bin that is detected thereby to control integrated circuit means to stop the article carrier at the center of the bin.

Another specific object of the invention is to provide a courier control system of the type having a horizontal series and a vertical series of code elements that are read to control the respective coordinate movements of an article carrier with an integrated circuit logic control system including means causing fine positioning thereof to the center at each bin and means operable following extension and retraction of the table for returning the article carrier back to the last read horizontal code elements preparatory to further movement.

Other objects and advantages of the invention will hereinafter appear.

DESCRIPTION OF THE PREFERRED EMBODIMENT

Figures 1, 2:
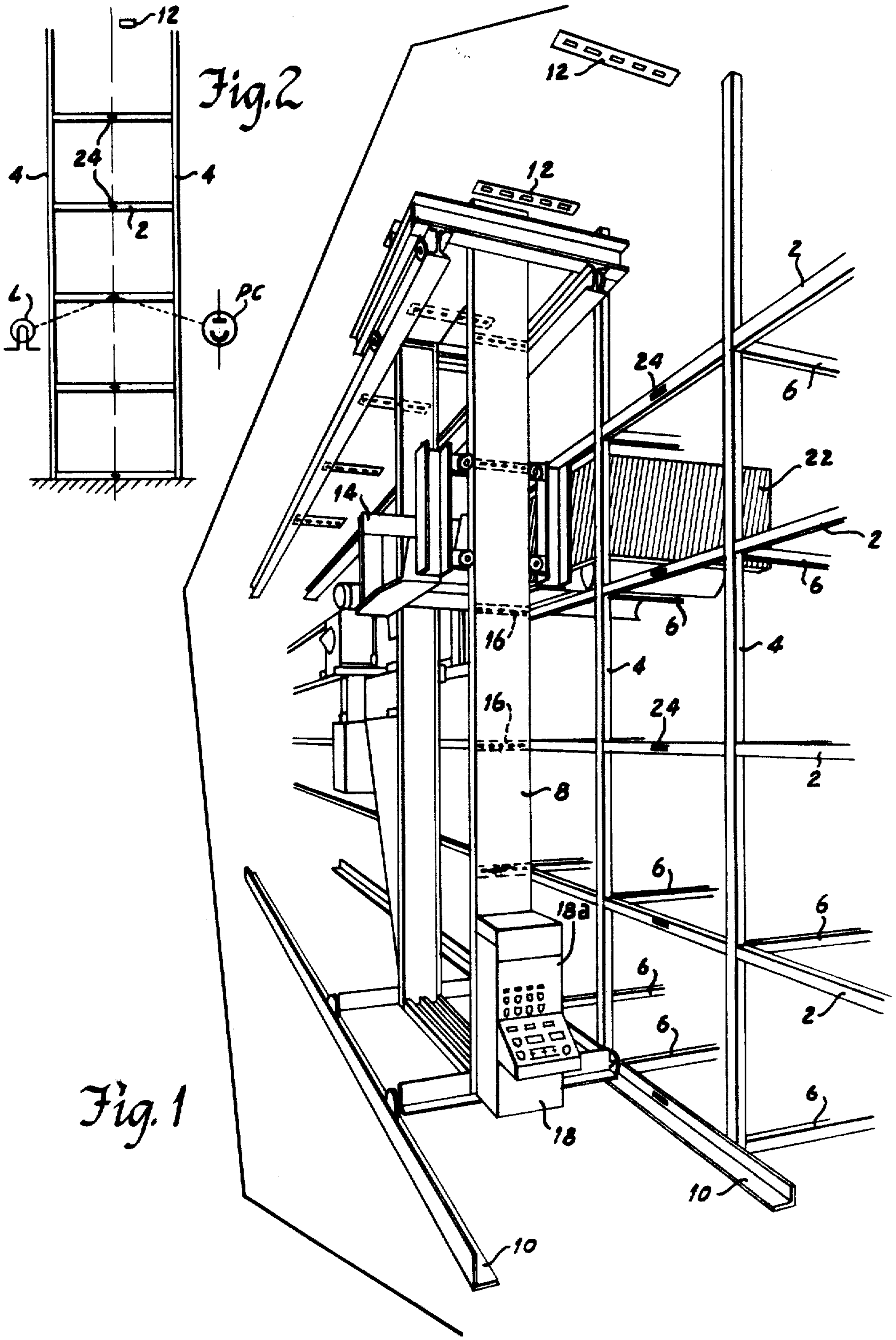
FIG. 1 is a perspective view of a rack of bins and a stacker crane or courier mounted for movement past the front of the bins for storing articles therein.
FIG. 2 is a front elevational view of a column of bins showing the location of the code bars common to the bins in the column and the locations of the noncode (reflective tape) elements individual to each bin.

Referring to FIG. 1, there is shown a rack structure including a plurality of bins in which articles such as pallet supported boxes or packages may be stored. This rack structure is made from steel members such as angle members, channel members and the like, and includes horizontal members 2, vertical members 4 and lateral members 6. These members have flanges projecting into the bin from opposite sides thereof in known manner onto which a load may be deposited after it has been extended between the horizontal and vertical members.

While only a right rack is shown, it will be apparent that there is a similar left rack on the other side of the aisle in which the courier travels.

The courier shown in FIG. 1 comprises a frame 8 that runs on horizontal tracks 10 along the aisle driven by an electric motor and guided by rails 11. This horizontal movement is controlled by a code reader mounted at the top or bottom on the frame. This code reader reads a series of sets of horizontal code bars 12, there being one set of magnetic code bars for each vertical column of bins. While the code bars are shown at the top, they could be at the bottom.

This courier also comprises a hoist 14 mounted on the frame for vertical movement. The hoist is driven by an electric motor up and down along the frame. Vertical code bars 16 are mounted along the frame. These vertical code bars are magnetic code bars that are arranged to be read by a code reader to control vertical movement of the hoist to the selected bin in a selected column.

A control cabinet 18 is also mounted on the frame and houses electronic controls and supports a control panel 18*a* whereby the input codes may be put into the system when the courier is at a pickup station at an end of the aisle.

The hoist 14 comprises a table 20 that supports a load 22 and can be driven in opposite directions to reach into the right or left bins on opposite sides of the aisle. This table is driven by an electric motor from either of two vertical positions at each bin. When it is extended from a lower position, it will be raised within the bin to pick up the load and then retracted to retrieve the load. When it is extended from the upper position, it will be lowered within the bin to deposit the load and then retracted to store the load in the bin.

The integrated circuit logic system shown in FIGS. 4*a*—*e* will be primarily concerned with movement of the courier to a fine position at the center of bin after the code reader apparatus has stopped it at the bin and returned to code position. The apparatus with which the logic circuit operates is shown in FIG. 2.

As shown in FIG. 2, each column of bins is provided with the aforementioned magnetic code bars 12. This set of code bars is preferably mounted slightly to the right of the center point of the bin as shown in FIG. 2 or is mounted so that it stops the courier slightly to the right of the center of the bin. The amount by which the stopping point is displaced from the center of the bin would exceed any amount by which a bin might be likely to be misaligned from the vertical. In this manner, the courier can always be moved in the reverse direction, after code-controlled stopping, to reach the center of the bin.

Each bin is provided with a strip of reflective tape 24 or similar noncode element mounted at the center of each bin for horizontal motion control or mounted in such a position that detection thereof will stop the courier at the center of the bin.

After the courier is stopped at the bin under control of the code bars, slow reverse movement thereof is initiated until a photocell PC detects a light beam from the reflective tape lighted by lamp L, shown in FIG. 2, whereupon the courier is stopped at the center of the bin for accurate positioning. Such fine positioning is necessary if the bin column is not exactly vertical so that the table will not strike the vertical frame members when it is extended into the bins.

Since the sets of code bars cost more than sticker tape, only one series thereof is used for each direction of motion. The relatively inexpensive reflective tape strips are used for fine positioning since a large number, one for each bin, is required and they need not be coded.

Figure 3A:
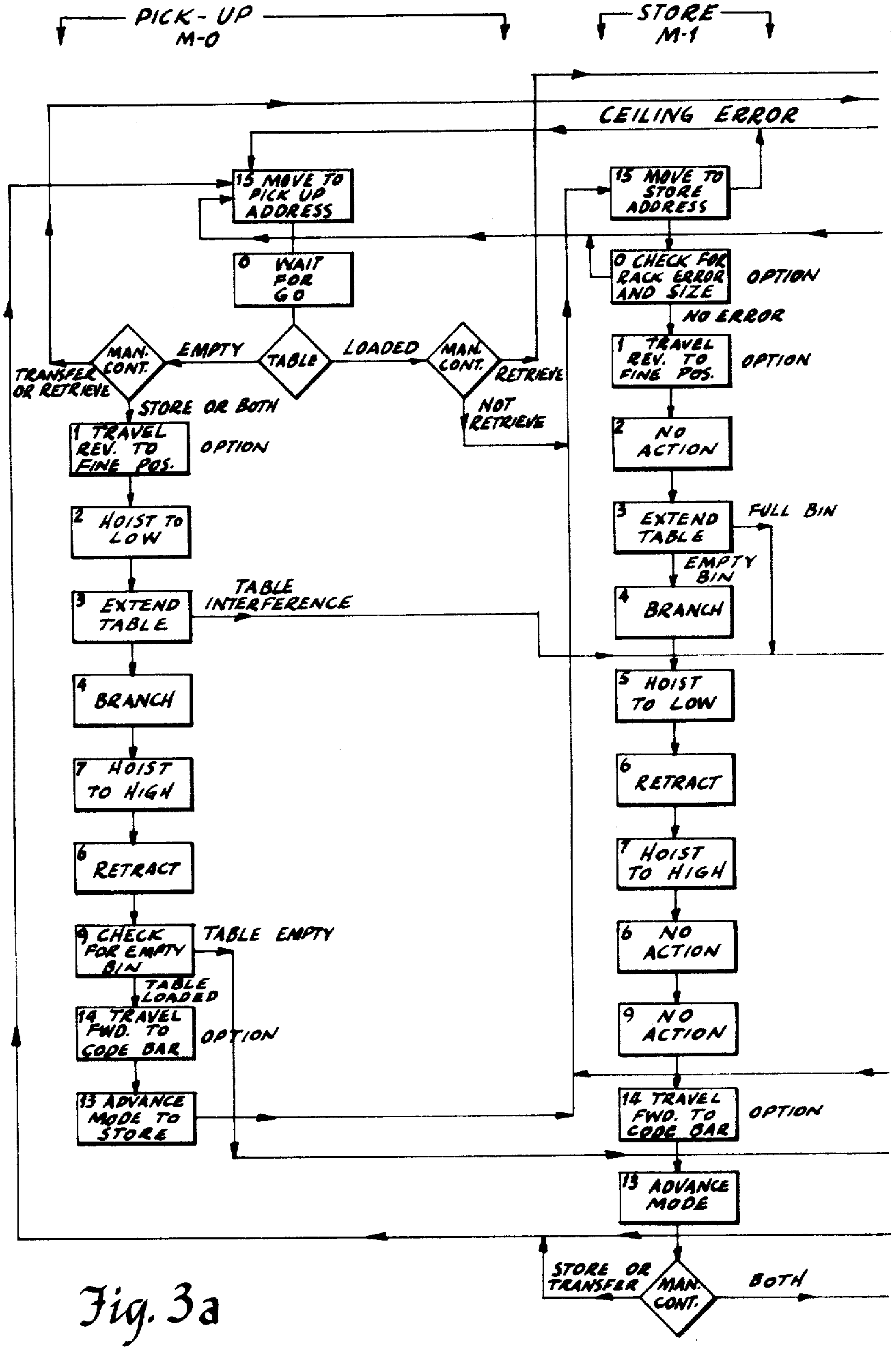
FIG. 3*a* and 3*b* show a flow diagram depicting the operating modes and the program steps of the courier control system.
Figure 3B:
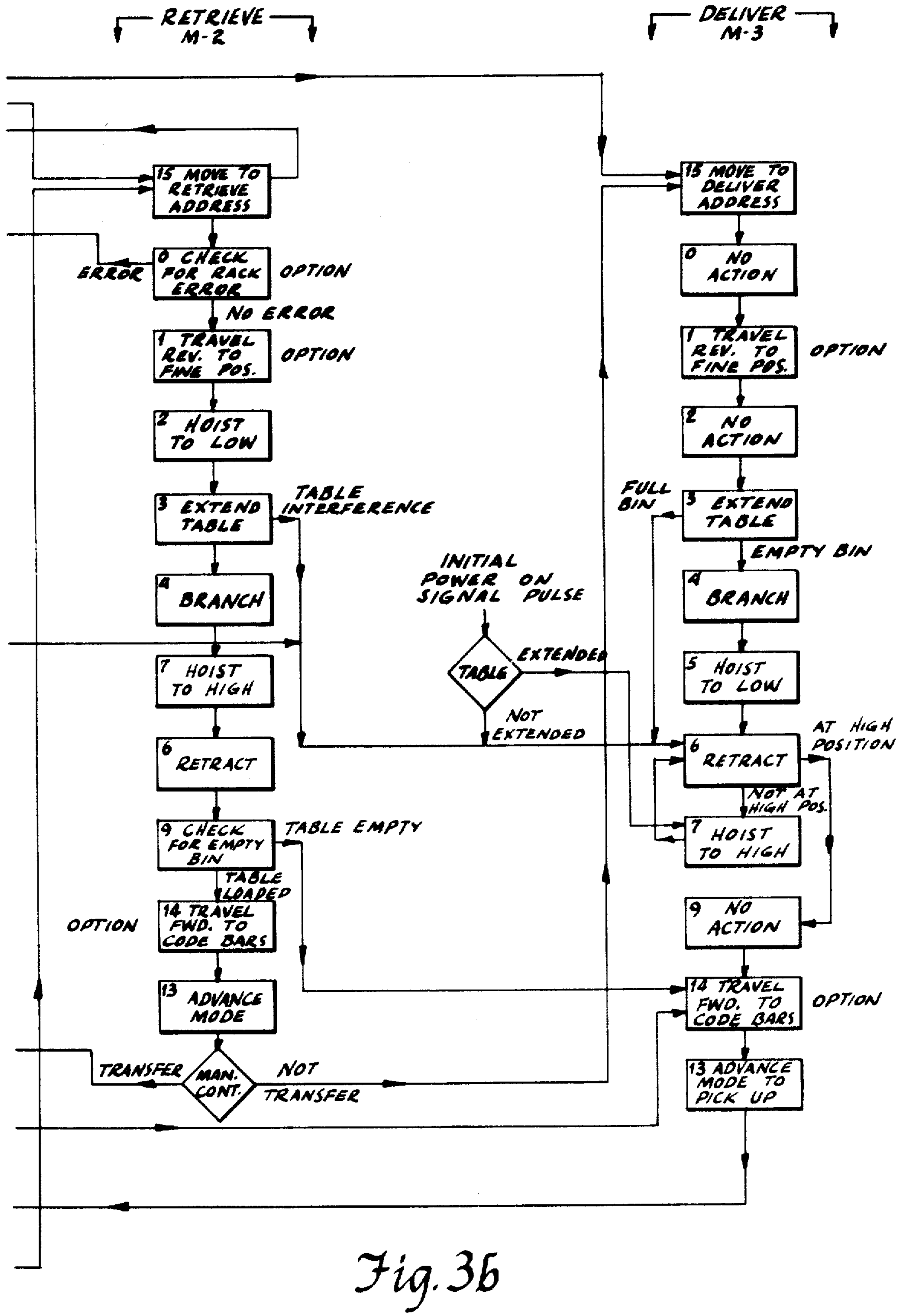

The overall system operation is shown in the flow diagram in FIGS. 3*a* and 3*b*. The rectangles represent program steps and are arranged in four vertical columns according to the four modes of operation. These modes are the pickup mode M–0, the store mode M–1, the retrieve mode M–2, and the delivery mode M–3. These modes are selected by setting flip-flops into different states.

Each mode has a plurality of program steps. The numbers in the upper left-hand corner of the rectangles indicate the program steps. These steps are selected by setting flip-flops into different states, that is, P and Q program flip-flops, as hereinafter more fully described. Two P program flip-flops and two Q program flip-flops will give 16 steps in accordance with 16 possible combinations of flip-flop states. All of these steps are not used in each mode as will be apparent in FIG. 3. The legends within the rectangles describe generally the functions performed at the respective steps and these will be referred to later on in connection with the specific operations described.

Figure 4A:
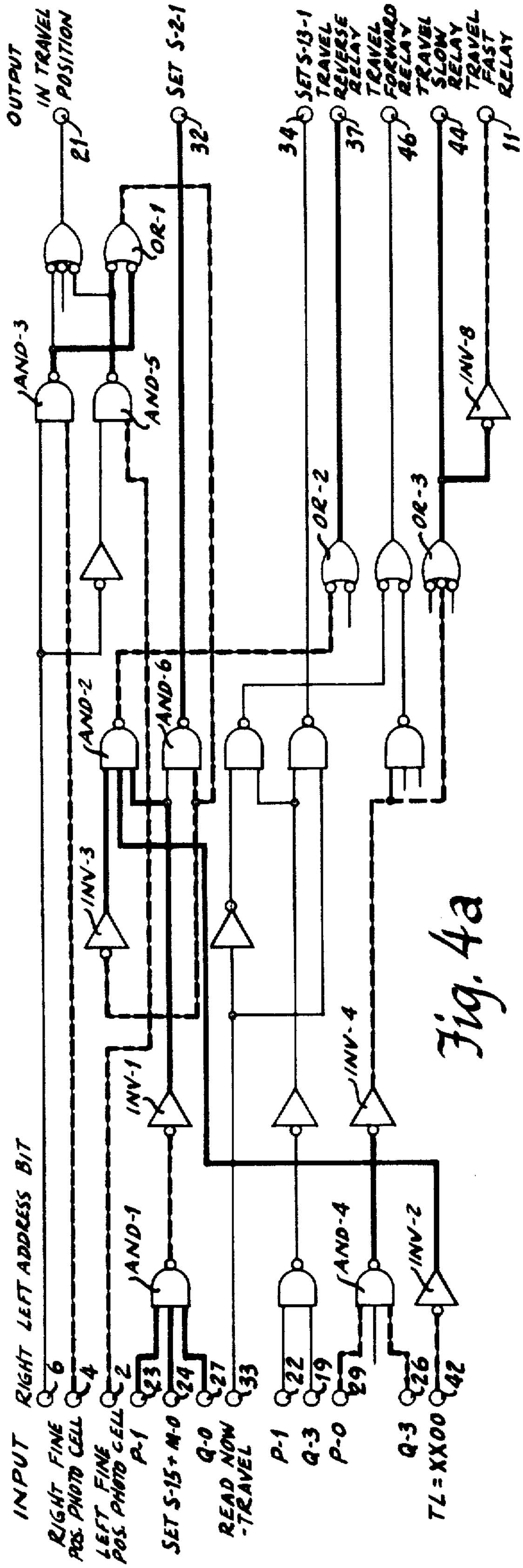
FIGS. 4*a* to 4*e* show an integrated circuit logic diagram for controlling positioning of the courier of FIG. 1.

Referring to FIG. 4*a*, there is shown a portion of an integrated circuit logic system for performing the fine positioning controls and certain other controls hereinafter more specifically described. This integrated circuit logic system is a unitary device mounted on a single board that may be inserted into a slot in a logic bucket to make the electrical connections therefrom to the remainder of the system. The integrated circuit is an electronic logic circuit sealed in a small plastic slab. One or more of these integrated circuits may be mounted on a single board and electrically connected to connectors at the rear edge of the board. These connectors then connect to electrical connectors at the rear of the bucket when the board is plugged into one of the slots therein. Each such board is provided with 46 connector terminals to which the integrated circuits mounted thereon are connected.

FIG. 4*a* shows a portion of the integrated circuits that are mounted on board No. 4 that is inserted into slot No. 7 in the logic bucket. As shown therein, these integrated circuits are connected to a number of connector terminals. For convenience, the signal input terminals are shown at the left and the output terminals are shown at the right, although all of these terminals are actually arranged in two vertical columns at the rear edge of the board. To make inspection of this integrated circuit logic diagram in FIGS. 4*a* to 4*e* more meaningful in connection with the following description of operation thereof, the left and right terminals thereof have been given certain designations as shown on the drawing.

Also, to enable the following operations to be followed on the drawing, high signals have been shown in FIGS. 4*a* to 4*e* in heavy solid lines and low signals have been shown in heavy broken lines. To avoid confusion, the several primary operations of this integrated circuit logic system have been shown in several different illustrations in FIGS. 4*a* to 4*e*, each showing the same integrated circuit but depicting the different operations in heavy lines as aforesaid. These five illustrations show in heavy lines the following operations:

FIG. 4*a*—Travel to fine position mark.

Figure 4B:
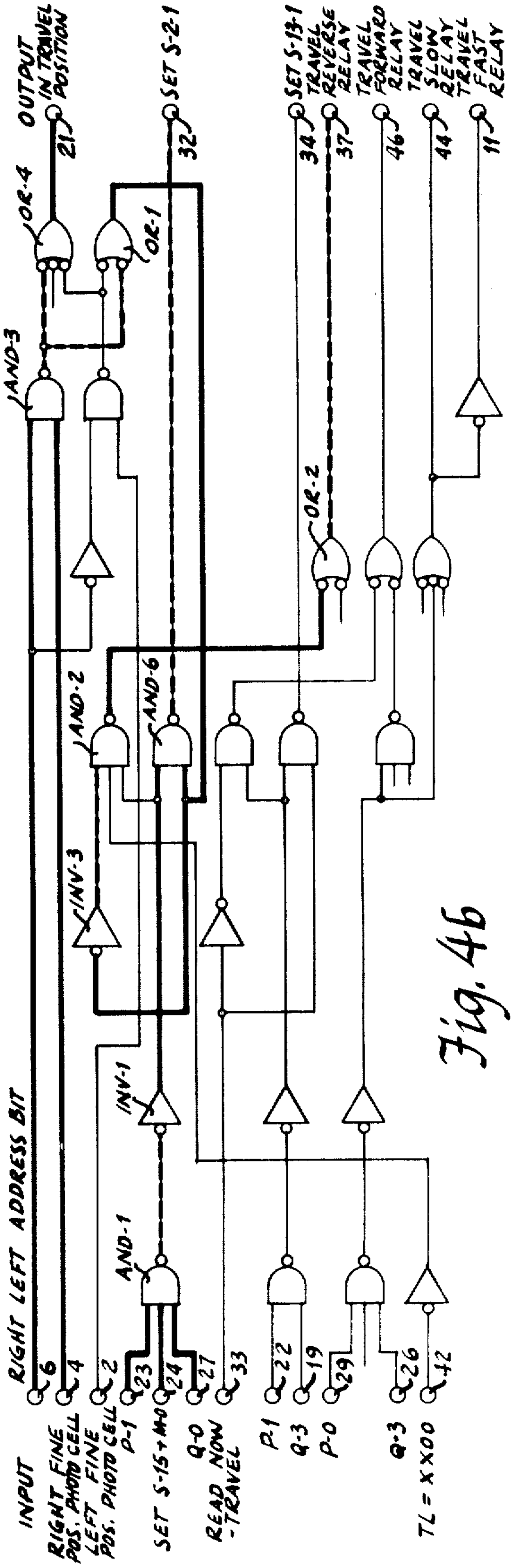

FIG. 4*b*—Terminate move to fine position, right fine position photocell.

Figure 4C:
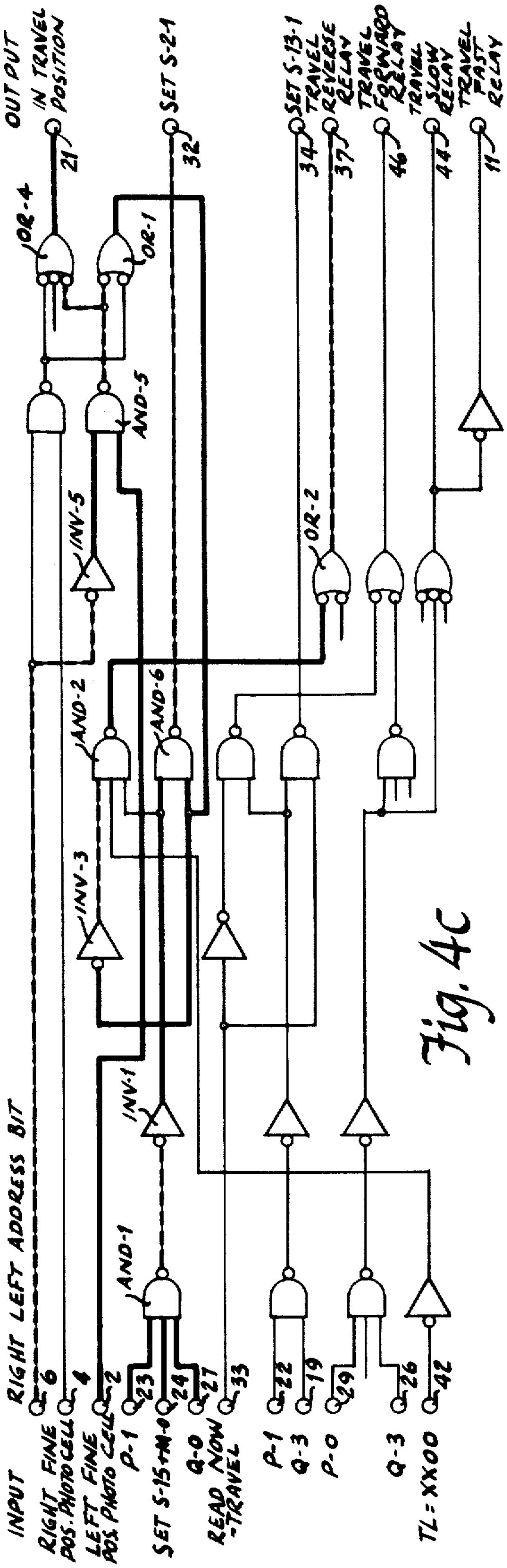

FIG. 4*c*—Terminate move to fine position, left fine position photocell.

Figure 4D:
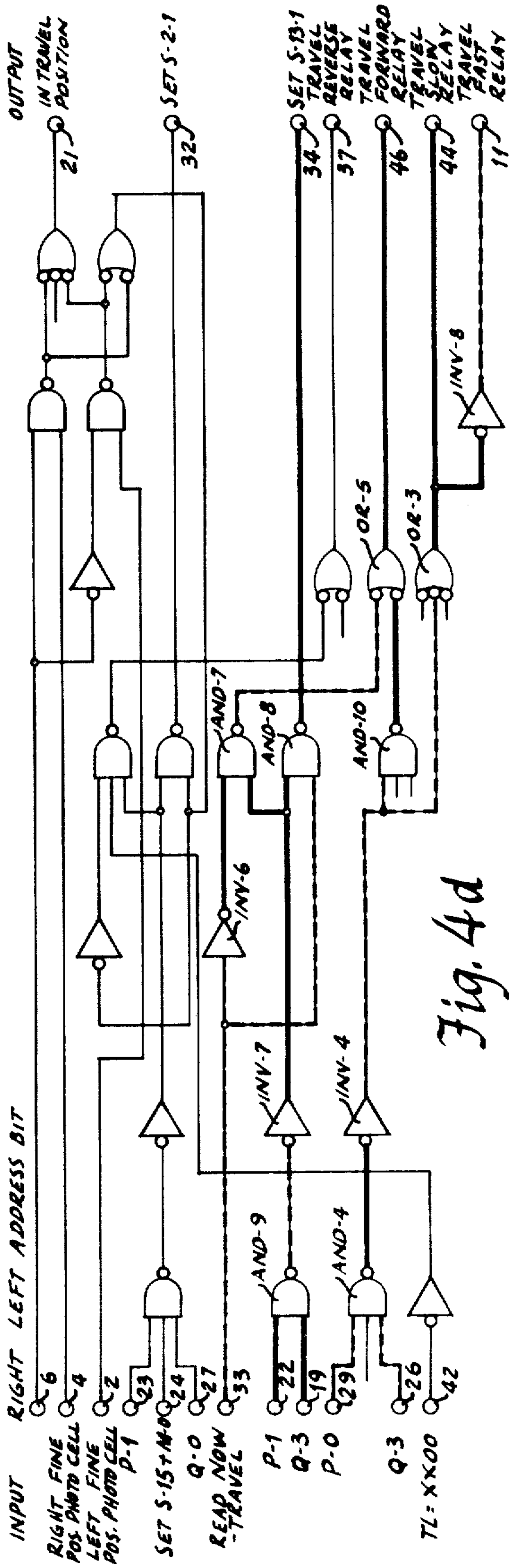

FIG. 4*d*—Travel forward to read now travel gate.

Figure 4E:
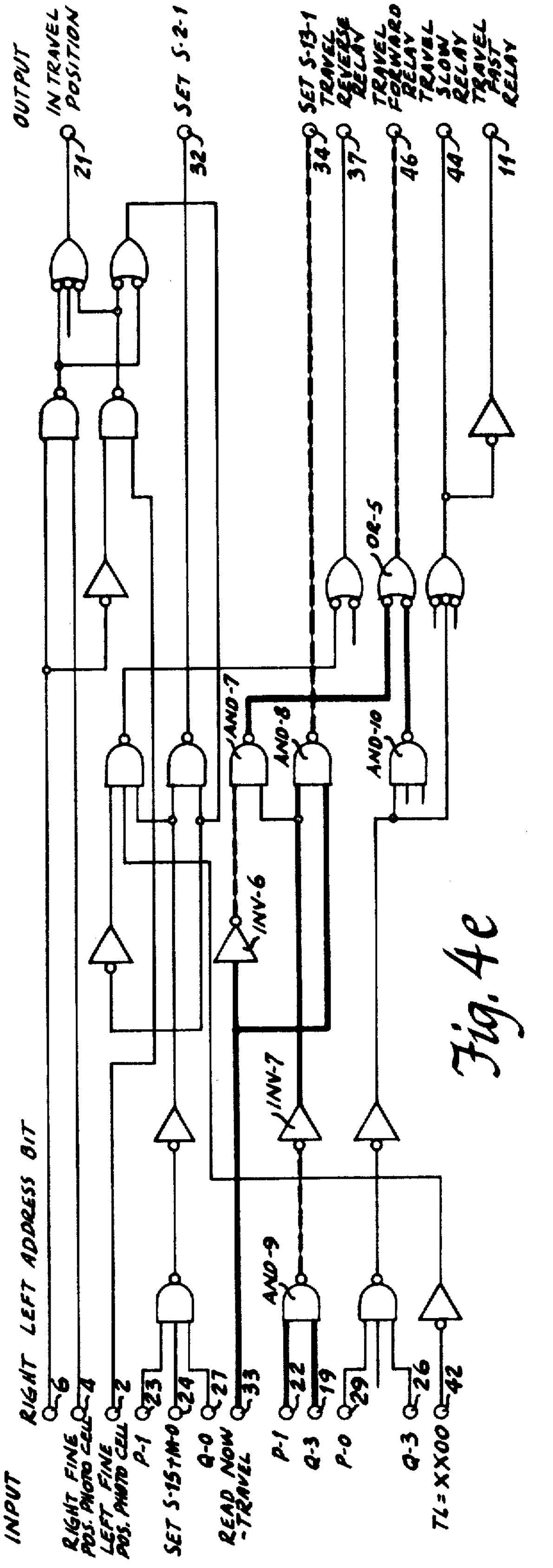

FIG. 4*e*—Terminate return to read now travel gate motion.

THE AND/OR LOGIC SYMBOLS

The logic operations generated by the circuits, or more precisely, the logic operations that the circuits are being asked to perform, are shown in FIGS. 4*a*—*e* by shapes. The symbols prefixed AND and OR therein show the two shapes that correspond to the AND and OR logic operations, respectively. The symbol prefixed INV performs an inversion or NOT logic operation. These are the shapes that are in prevalent use for switching circuits based on integrated circuits.

The next task of the symbol is to show what signal value, or signal values, are significant. The symbols in FIGS. 4*a*—*e* show this also. A "high" value is significant if there is no circle (small circle at the inputs or outputs) and a "low" value is significant if there is a circle. The high value of signal is a positive voltage and the low value of signal is at near ground potential.

The symbols in FIGS. 4*a*—*e* show what to look for. If the circuit is supposed to behave as an AND circuit, one looks for high on all inputs and low on the output. If the circuit is supposed to behave as an OR circuit, one looks for low on one or more inputs and high on the output.

If the proper signals are in place for a given operation, that operation is activated. Actually, this can be given in terms of only the output. The circuit is an activated AND when the output is low. It is an activated OR when the output is high. It is therefore evident that if the circuit is an activated AND, it is an inactivated OR and vice versa.

The logic diagrams may be understood by tracing down through the active portions thereof. For this purpose, the active parts are shown in FIGS. 4*a*—as follows. An active line that has a high signal is shown as a heavy dark line superimposed on the usual interconnecting line. An active line that has a low signal is shown as a heavy dashed line superimposed on the connecting line. The lines that are not active are assumed to be inactive.

If one of the inputs to the logic circuit is allowed to float or is connected to a plus 5 volt-AC supply, the circuit becomes an inverter as far as the other input is concerned. That is, the output signal value is the opposite of the input signal value. The symbol for the inverter is prefixed by INV. The significance circles are customarily placed on the inverter symbol in order to match the circles of an element connected to the inverter as shown in FIGS. 4*a*—*e*.

MOVE TO FINE POSITION—FIGS. 4a—c

The purpose of this operation is to center the courier in front of the bin.

The code bars stop the courier at the bin. But only one set of code bars is used for the entire vertical column of bins since it only has to stop the horizontal motion of the courier. Consequently, if there is any variation in vertical alignment of the bins relative to the mast, the courier might not be centered in front of the bin when it stops, particularly in the case of bins farthest from the code bars that control the horizontal motion. Accurate centering is required so that the article can be moved freely into the bin on the store cycle and so that the courier table can be extended freely below the article supporting pallet on the retrieve cycle without touching or scraping the bin structure or rack.

To take care of such misalignment problem particularly where the bin structure is quite high, the courier is moved at a low speed to the center of the bin where it is stopped under the control of a photocell detecting a reflective marker. To keep the apparatus simple, only one row of the relatively more complex magnetic code bars is used to control horizontal movement. But for centering purposes, the relatively simpler reflective tape is placed at each bin. As will be apparent, a single reflective marker will serve for this purpose at each bin since no code is required but merely a stopping signal when the courier is centered.

The signals that control the movement to fine position at the center of the bin consist of (1) the program step signal, (2) a first permissive signal indicating that a variable bin inhibiting control signal has not been received, and (3) a second permissive signal indicating that the courier has reached a zero indicative travel subtractor position with respect to the input horizontal code and the magnetic code bars.

The program step signal, P-1 and Q-0, comes in at left-hand terminals 23 and 27 as a high signal, positive voltage. It will be apparent from the following step program list that flip-flop P in position 1 and flip-flop Q in position 0 is indicative of the system readiness to perform step 1 of one of the modes.

STEP PROGRAM

| | Flip-flops P and Q | | | | | |
|---|---|---|---|---|---|---|
| | Position | | Outputs | | | |
| | | | P | | Q | |
| | P | Q | A | B | C | D |
| Step: | | | | | | |
| 0 | 0 | 0 | 0 | 0 | 0 | 0 |
| 1 | 1 | 0 | 1 | 0 | 0 | 0 |
| 2 | 2 | 0 | 1 | 1 | 0 | 0 |
| 3 | 3 | 0 | 0 | 1 | 0 | 0 |
| 4 | 3 | 1 | 0 | 1 | 1 | 0 |
| 5 | 2 | 1 | 1 | 1 | 1 | 0 |
| 6 | 1 | 1 | 1 | 0 | 1 | 0 |
| 7 | 0 | 1 | 0 | 0 | 1 | 0 |
| 8 | 0 | 2 | 0 | 0 | 1 | 1 |
| 9 | 1 | 2 | 1 | 0 | 1 | 1 |
| 10 | 2 | 2 | 1 | 1 | 1 | 1 |
| 11 | 3 | 2 | 0 | 1 | 1 | 1 |
| 12 | 3 | 3 | 0 | 1 | 0 | 1 |
| 13 | 2 | 3 | 1 | 1 | 0 | 1 |
| 14 | 1 | 3 | 1 | 0 | 0 | 1 |
| 15 | 0 | 3 | 0 | 0 | 0 | 1 |

MODE PROGRAM

Flip-Flop M

| Mode | Position M | Outputs E | F |
|---|---|---|---|
| Pickup | 0 | 0 | 0 |
| Store | 1 | 1 | 0 |
| Retrieve | 2 | 1 | 1 |
| Deliver | 3 | 0 | 1 |

The first permissive signal comes in at left-hand terminal 24 as a high signal designated SET S-15 and M-0. If this terminal has a low signal, ground potential, it will inhibit the move to fine position such as in the case of a variable bin size of shelf validity check producing a bin selection error signal. However, assuming that no bin size or shelf selection error has occurred, this signal on terminal 24 will remain as a high signal and the fine positioning may proceed.

Having these three high signals on the three inputs of AND logic AND-1 causes a low signal output therefrom. This low signal is inverted in inverter INV-1 to a high signal and applied to the lower input of logic AND-2.

The second permissive signal comes in at left-hand terminal 42 as a low signal designated *TL*=XX00. This signal is obtained from the horizontal travel subtractor least significant bits or LSB. This logic signal is provided whenever the last two bit positions in the difference between the input address binary code and the read address binary code is zero. That is, the difference between the desired position code and the code read from the magnetic code bars is zero as to the last two bit positions, meaning that the courier has reached the intended bin under magnetic code control.

This low signal is inverted to a high signal in inverter INV-2 and applied to the middle input of logic AND-2.

A high signal to the upper input of logic AND-2 is obtained as follows to cause operation of the travel reverse relay.

If the address indicates that the table will be extended to the right, there will be a high signal at left-hand terminal 6, this terminal being designated RIGHT LEFT ADDRESS BIT. If, on the other hand, the address indicates table motion to the left, there will be a low signal on terminal 6. These signals may be provided by closing and opening a switch or the like.

Assuming first a high signal on terminal 6, it will be applied to the upper input of logic AND-3. The lower input of logic AND-3 receives a low signal until a reflected signal is received by the photocell when the courier is centered with respect to the bin.

As a result of these inputs, logic AND-3 applies a high signal to the lower input of OR logic OR-1. Consequently, the latter applies a low signal back to the input of inverter INV-3. This low signal is inverted therein to a high signal and applied to the upper input of logic AND-2.

This logic AND-2 now has high signals on all three inputs and applies a low signal to the upper input of logic OR-2. As a result, logic OR-2 applies a high signal to right-hand terminal 37 designated TRAVEL REVERSE RELAY. This means that this high signal causes energization of the travel reverse relay to cause energization of the courier travel motor in the reverse direction.

At the same time, the travel slow relay is energized to cause the courier to move slowly in the reverse direction until it is stopped at the center of the bin by the photocell detecting the reflector tape. For this purpose, when the programmer has left step 15, that is, has completed the move to store address, left-hand terminals 29 and 26 designated P-0 and Q-3, respectively, will each have a low signal. These signals are applied to the upper and lower inputs of logic AND-4 to cause a high signal to be applied therefrom.

The signal on the middle input of logic AND-4 coming from a terminal (not shown) designated INITIAL POWER ON, although high at this time, is not important at this time since the low signals on the upper and lower inputs maintain the output of this logic at a high value. The INITIAL POWER ON signal is used at another time to provide a motion inhibiting action as the designation of this terminal indicates.

The high output of logic AND-4 is inverted to a low value by inverter logic INV-4 and applied to the middle input of logic OR-3. As a result, this OR logic provides a high output that is applied through terminal 44 to energize the travel slow relay.

Both the travel reverse relay and the travel slow relay being now energized, the courier moves slowly in the reverse direction toward the center of the bin. When it reaches the center of the bin, the right photocell receives a reflected light from the reflective tape in FIG. 2 and applies a high signal, shown in FIG. **4*b*, to left-hand terminal 4** that is designated RIGHT FINE POSITION PHOTOCELL. This causes the output of logic AND-3 to shift from high to low and further causes the following switching to take place to terminate the slow reverse movement of the courier. The output of logic OR-1 switches from low to high. The output of logic INV-3 switches from high to low. The output of logic AND-2 switches from low to high. And the output of logic OR-2 switches from high to low to deenergize the travel reverse relay and stop the courier at the center of the bin.

Also, the output of logic OR-4 switches from low to high and is applied to terminal 21 as a permissive signal to allow the table to be extended. This is shown in FIG. **4*b***.

If the courier misses the fine position mark such as when the reflective tape is missing, it will continue to travel in the reverse direction at a low speed until the next lower numbered magnetic code is read at the next lower numbered bin and will stop there. This is done by the aforementioned second permissive signal coming in at left-hand terminal 42 in FIG. **4*a*** and designated *TL*=XX00. When this next lower magnetic code is read, the difference between it and the desired position code will be minus one, indicated by the last two bits of the binary difference code being 11. This will cause the signal at terminal 42 to shift from low to high and will further cause the following switching to take place to stop the courier. The output of logic INV-2 shifts from high to low. The output of logic AND-2 will shift from low to high. And the output of logic OR-2 shifts from high to low to deenergize the travel reverse relay and stop movement of the courier. As can be seen, this is an abnormal condition and the courier will have to be removed from this position by manual control or by other means that is provided for in actual practice. Such other means is a power-on operation whereby disconnection and reconnection of power causes the courier to be returned to the pickup station.

If the courier is on its way to the left bin rather than the right bin, the move to fine position is controlled in the same way as hereinbefore described except that it is stopped as shown in FIG. 4c by the left reflective tape. If the address indicates table motion to be left, there will be a low signal on terminal 6. This low signal is inverted in logic INV-5 to apply a high signal to the upper input of logic AND-5. The lower input of this logic AND-5 has a low signal. This low signal comes from left-hand terminal 2 as shown in FIG. 4a designated LEFT FINE POSITION PHOTOCELL since the courier has not reached the reflective tape.

As a result of the high and low signal inputs, logic AND-5 applies a high signal as shown in FIG. 4a to the upper input of logic OR-1. A low signal is applied from logic OR-1 back, inverted to a high signal in logic INV-3 and applied to the upper input of logic AND-2. The other inputs to this logic AND-2 are the same as hereinbefore described so that the travel reverse relay is energized.

When the left fine position photocell detects a reflective tape upon the courier reaching the center of the left bin, the signal on terminal 2 switches to high as shown in FIG. 4c. This high signal is applied to the lower input of logic AND-5. Since both inputs have high signals, the output of logic AND-5 switches to low and is applied to the upper input of logic OR-1, and the lower input of logic OR-4. This causes the output of logic OR-1 to switch from low to high. This high signal is fed back, inverted to a low signal in logic INV-3 and applied to the upper input of logic AND-2. The output of logic AND-2 goes to a high signal and the output of logic OR-2 goes to a low signal to deenergize the travel reverse relay. This causes the courier to be stopped at the center of the left bin. Also, the output of logic OR-4 goes to high value at terminal 21 to allow extension of the table.

The program is advanced to step 2 when the courier stops at the center of the bin whether this is done by the right reflective tape or the left reflective tape. This is done by generating a SET S-2-1 signal. For this purpose, the high signal that was applied from logic INV-1 to the lower input of logic AND-2 in FIG. 4a was also applied to the upper input of logic AND-6 in FIG. 4c. While the move to fine position operation is taking place, the low signal going from logic OR-1 to logic INV-3 is also applied to the lower input of logic AND-6. Consequently, the output of logic AND-6 is a high value as shown in FIG. 4a and is applied to terminal 32 designated SET S-2-1, meaning set the program to step 2. It requires a shift from high to low to advance the program to step 2 as follows.

As the photocell detected the reflective tape at the center of the bin, the output of logic OR-1 shifted from low to high as hereinbefore described as shown in FIGS. 4b and 4c. This high signal is applied to the lower input of logic AND-6. With high on both inputs, the output of logic AND-6 shifts to low and is applied to terminal 32 to advance the program to step 2.

TRAVEL FORWARD TO READ NOW TRAVEL GATE—FIGS. 4d—e

This operation is part of the move to fine position option and is provided for the purpose of returning the courier to the binary code reading position called the "read now-travel gate" before further motions are initiated. It will be recalled that the move to fine position operation described above caused the courier to move in the reverse direction slowly until stopped at the precise center of the bin by a photocell detecting a reflective tape on the bin.

When a package is thereafter stored or retrieved, the table is retracted and the courier is ready to move on. However, it is now displaced from the magnetic code bars and cannot read them. In order to obtain a valid travel address for the next movement, the courier must be moved forward to read the code bars. This valid travel address is required mainly for the initial power-on program.

This forward travel is controlled by the heavy-lined portion of the integrated circuit shown in FIG. 4d. A low signal appears at terminal 33 designated READ NOW-TRAVEL indicative of displacement of the courier from the code bars. This low signal is inverted in logic INV-6 to apply a high signal to one input of logic AND-7. This low signal is also applied to one input of logic AND-8, causing it to provide a high signal to terminal 34 designated SET S-13-1. This high signal inhibits advancement of the program to step 13.

At the same time, high signals appear at terminals 22 (P-1) and 19 (Q-3) indicative that the program is at step 14; see above step program table. These high signals are applied to logic AND-9 that applies a low signal, inverted in logic INV-7 to a high value that is applied to the other input of logic AND-7. This causes the latter to provide a low signal to logic OR-5 which in turn applies a high signal to terminal 46 to energize the travel forward relay.

At the same time, low signals appear at terminals 29 (P-0) and 26 (Q-3) that are indicative of the program not being at step 15. These low signals are applied to logic AND-4 causing it to provide a high signal, inverted in logic INV-4, to apply a low signal to logic OR-3.

This low signal is also applied to one input of logic AND-10 to maintain a high signal on its output to enable deenergization of the travel forward relay as hereinafter described in connection with FIG. 4e.

This low signal input to logic OR-3 causes it to apply a high signal to terminal 44 to energize the travel slow relay. This also causes logic OR-3 to apply a high signal, inverted in logic INV-8, to apply a low signal to terminal 11 to inhibit the travel fast relay.

The courier will now travel at a slow speed in the forward direction until the code reader reaches and reads the code bars. At this time, the low signal at input terminal 33 shifts to a high value to stop the courier and to advance the program to step 13 when the signals at output terminals 34 and 46 shift to low value as shown in FIG. 4e and hereinafter described.

The operating (low) signal at input terminal 33 may be obtained from a transistor or the like operated by the magnetic reading head such that it is rendered conducting to provide a low signal when the magnetic reading head is not at the code bars and is rendered nonconducting to provide a high signal when the magnetic reading head reaches the code bars, or the like.

FIG. 4e shows in heavy lines how the forward travel is terminated. As shown therein, the input signal at terminal 33 ha shifted to a high value when the courier reached the code reading position. This high signal is inverted in logic INV-6 to apply a low signal to the upper input of logic AND-7. Consequently, the output of the latter shifts to a high value that is applied to one input of logic OR-5. This causes the output of logic OR-5 to shift to a low value since its lower input is also at high value, derived from logic AND-10 in the manner shown in FIG. 4d and hereinbefore described.

This shift from high to low value at the output of logic OR-5 is applied to output terminal 46 to deenergize the travel forward relay and stop the courier at the code bar reading position.

At the same time, the high signal at input terminal 33 in FIG. 4e *is applied to the lower input of logic AND-8. This causes the output thereof to shift from high to low. This low signal is applied to output terminal 34 to advance the program to step 13.*

While the integrated circuit board in actual practice contains more circuits for performing additional functions, only those portions have been shown in FIGS. 4a-that control the move to fine position and return to the code reading position.

It will be apparent from the foregoing description that the move to fine position operation can be made an optional feature in the courier control system in a very simple and straightforward manner. All that is necessary is to connect in signals that simulate the reflective tape detection signals. For this purpose, a positive voltage may be connected by a pair of jumpers at the logic bucket to input terminal 4 designated RIGHT FINE POSITION PHOTOCELL and input term 2 designated LEFT FINE POSITION PHOTOCELL. The integrated circuit need not be changed.

Under these conditions, the system will function, as soon as the courier reaches its destination code controlled position, to provide a high signal at output terminal 21, IN TRAVEL POSITION, as a permissive signal to allow the table to be extended into the selected bin This permissive signal is provided in the same manner hereinbefore described.

While the apparatus hereinbefore described is effectively adapted to fulfill the objects stated, it is to be understood that the invention is not intended to be confined to the particular preferred embodiment of integrated circuit courier control system with slow reverse movement for centering at bin disclosed, inasmuch as it is susceptible of various modifications without departing from the scope of the invention.

I claim:

1. In a courier control system for an automatic warehouse having a rack providing a plurality of storage bins in vertical columns, and a courier operable in coordinate travel, hoist and extend movements, and further having numerical address-controlled means for moving the courier to a selected bin and stopping the courier in front of the bin preparatory to extension into the bin to store an article therein or to retrieve an article therefrom, wherein the vertical columns of bins are subject to misalignment so that the numerical address controlled means might not afford accurate stop positioning of the courier in front of the bin, the improvement comprising:

means for causing the numerical address-controlled means to stop the courier always at one side of the center of the bin;

integrated circuit logic control means operable when the courier has been stopped by the numerical address-controlled means for initiating slow fine positioning movement of the courier toward the center of the bin;

a detectable element for each bin indicative of the center thereof;

and means for detecting said element when the courier reaches the center of the bin;

and means in said integrated circuit means responsive to said detecting means for stopping the courier in registration with the bin.

2. The invention defined in claim 1, wherein said means for causing the numerical address controlled means to stop the courier always at one side of the center of the bin comprises:

means for stopping the courier past the center of the bin in the travel direction.

3. The invention defined in claim 1, wherein said means for initiating slow fine positioning movement of the courier toward the center of the bin comprises:

means for initiating slow fine positioning movement in the reverse direction to bring the courier from a point beyond the center of the bin back to the center of the bin.

4. The invention defined in claim 1, wherein said integrated circuit logic control means comprises:

integrated circuit control means responsive to four signals including:

a first signal indicating that the article has reached its code controlled destination;

a second signal indicating that the article is addressed to the right or left bin;

a third signal indicating that the program is at step one;

and a fourth signal indicating that no variable bin size or shelf error has occurred.

5. In a courier control system for an automatic warehouse having a rack providing a plurality of storage bins in horizontal rows and vertical columns and a courier operable in coordinate travel, hoist and extend movements to store articles in and to retrieve articles from the bins, and further having a positive address system including means for reading and subtracting actual-position indicative codes as they are read from coded elements spaced along the horizontal and vertical paths of travel of the courier from desired-position indicative codes put into the system and for stopping the courier on a zero code difference indication in front of the bin preparatory to extension into the bin to store or retrieve an article, wherein the vertical columns of bins are subject to misalignment so that the single horizontal path coded element for a column might not afford accurate stop positioning of the courier for all the bins therein, the improvement comprising:

means arranging the coded elements and the reading means that control the travel direction of motion for stopping the courier at a displaced position to one side from the center of the selected bin, integrated circuit means operable when the courier has been stopped by the coded element for initiating slow fine positioning movement of the courier toward the center of the bin;

a detectable element for each bin indicative of the center thereof;

means for detecting said detectable element when the courier reaches the center of the bin to provide a control signal;

and integrated logic circuit means responsive to said control signal for stopping the courier in center registration with the bin and for enabling it to perform the extend movement into the bin.

6. The invention defined in claim 5, together with:

means in said integrated circuit means operable when the retraction movement from the bin has been completed for initiating slow return movement of the courier to the former code reading position, and including means operable when the courier reaches said former code reading position for stopping the courier thereby to provide an actual-position indicative code for use in controlling the next movement of the courier.

7. The invention defined in claim 5, wherein said means arranging the coded elements and the reading means to stop the courier at a displaced position with respect to each bin comprises:

means mounting the coded elements to cause them to stop the courier beyond the center point of the bin in the travel direction a distance greater than any contemplated misalignment of the bins.

8. The invention defined in claim 5, wherein:

said integrated circuit means that initiates slow fine positioning movement of the courier is an optional feature and comprises:

terminal means affording ready jumper connection of an electrical voltage thereto for simulating said control signal thereby enabling the courier to perform the extend movement into the bin directly from the code stopping position in which case the positive address system is arranged to stop the courier at the center of the bin rather than at the displaced position.

9. The invention defined in claim 5, wherein there are two racks providing right and left bins on opposite sides of an aisle along which the courier is arranged to travel and having means providing extension of the article supporting table in right or left direction to reach into the respective right and left bins under control of the desired position indicative codes that provide right-left extension indicative signals, together with:

means in said detecting means for providing a first control signal when the right-bin detectable element is detected and for providing a second control signal when the left bin detectable element is detected;

and said stopping means comprising means responsive to said first control signal and the right extension indicative signal for stopping the courier in center registration with the right bin and being responsive to said second control signal and the left extension indicative signal for stopping the courier in center registration with the left bin.

10. The invention defined in claim 5, wherein said integrated circuit means that initiates slow fine positioning movement of the courier comprises:

integrated circuits that respond to four different signals including:

a first signal indicating that the courier has reached its destination under code control;

a second signal indicating whether the article is addressed to the right of left bin;

a third signal indicative of the correct program step;

and a fourth signal indicative of no error in courier travel.